US007680752B1

(12) United States Patent
Clune, III et al.

(10) Patent No.: US 7,680,752 B1
(45) Date of Patent: Mar. 16, 2010

(54) SYSTEM AND METHOD FOR PREDICTIVE PROCESS MANAGEMENT

(75) Inventors: James Edmond Clune, III, Glendora, CA (US); Daniel John Dominguez, Azusa, CA (US)

(73) Assignee: Parasoft Corporation, Monrovia, CA (US)

( * ) Notice: Subject to any disclaimer, the term of this patent is extended or adjusted under 35 U.S.C. 154(b) by 1090 days.

(21) Appl. No.: 11/326,930

(22) Filed: Jan. 6, 2006

Related U.S. Application Data (60) Provisional application No. 60/642,269, filed on Jan. 6, 2005.

(51) Int. Cl.
*G06F 17/00* (2006.01)
*G06N 5/00* (2006.01)

(52) U.S. Cl. ...................................................... 706/45
(58) Field of Classification Search ..................... 706/45
See application file for complete search history.

(56) References Cited

U.S. PATENT DOCUMENTS

| | | | | | |
|---|---|---|---|---|---|
| 5,136,686 | A | * | 8/1992 | Koza ........................... | 706/13 |
| 5,343,554 | A | * | 8/1994 | Koza et al. .................... | 706/13 |
| 5,691,895 | A | * | 11/1997 | Kurtzberg et al. ............. | 700/29 |
| 5,710,700 | A | * | 1/1998 | Kurtzberg et al. ............. | 700/29 |
| 6,014,628 | A | * | 1/2000 | Kovarik, Jr. .................... | 705/1 |
| 6,606,744 | B1 | * | 8/2003 | Mikurak ...................... | 717/174 |
| 6,671,818 | B1 | * | 12/2003 | Mikurak ........................ | 714/4 |
| 7,124,101 | B1 | * | 10/2006 | Mikurak ....................... | 705/35 |
| 7,130,807 | B1 | * | 10/2006 | Mikurak ........................ | 705/7 |
| 7,539,532 | B2 | * | 5/2009 | Tran ........................... | 600/509 |
| 7,539,533 | B2 | * | 5/2009 | Tran ........................... | 600/509 |
| 7,558,622 | B2 | * | 7/2009 | Tran ........................... | 600/509 |
| 7,624,087 | B2 | * | 11/2009 | Birdwell et al. ............... | 706/60 |
| 2001/0034686 | A1 | * | 10/2001 | Eder ........................... | 705/36 |
| 2002/0138489 | A1 | * | 9/2002 | Trivedi et al. ................. | 707/10 |
| 2006/0004783 | A1 | * | 1/2006 | Carr et al. .................... | 707/100 |
| 2009/0132448 | A1 | * | 5/2009 | Eder ........................... | 706/13 |

\* cited by examiner

*Primary Examiner*—Michael B Holmes
(74) *Attorney, Agent, or Firm*—Christie, Parker & Hale, LLP.

(57) ABSTRACT

An integration platform for managing long term processes. The platform includes a runtime engine that manages the process instances and communication with the processes to provide Web services. The runtime engine includes an execution engine module and a prediction module. The prediction module generates predictions for executing processes for inbound and outbound messages and eventual process outcomes. The predictions may be utilized when requisite data is unavailable or under defined circumstances. The prediction module utilizes process history, process description and process state data to generate relevant prediction data. The prediction module may include a learning module that applies analytical algorithms to the process history and descriptions to create models for use by the prediction module.

33 Claims, 8 Drawing Sheets

SYSTEM AND METHOD FOR PREDICTIVE PROCESS MANAGEMENT

CROSS-REFERENCE TO RELATED APPLICATION

This application claims the benefit of U.S. Provisional Patent Application No. 60/642,269, filed Jan. 6, 2005, the entire content of which is incorporated herein by reference.

BACKGROUND (1) Field of the Invention

Embodiments of the invention relate to a system and method for managing processes. Specifically, the embodiments of the invention are related to a system and method for managing processes for Web services and similar business processes.

(2) Description of the Related Art

Efficient operation of a modern enterprise leverages automation and integration of business processes. At the same time, these business processes must be malleable to facilitate business agility in a dynamic marketplace. Traditional business integration solutions are expensive, brittle, monolithic and proprietary. The widespread initiative to adopt Web services is fueled by an understanding that effective business integration must be standards-based, non-proprietary, and technically grounded in a modular, loosely coupled architecture. Adopting a Web service orientation for business integration is both economically sound from a cost-saving point of view as well as strategically aligned with the business goal of increasing market responsiveness.

Both efficiency considerations and changing market conditions are driving the need for business process integration. Requirements of flexibility, interoperability, and cost-effectiveness point to service-oriented architectures based on Web service standards. These services need to be orchestrated to achieve business goals and business process execution language (BPEL) provides the standard for this orchestration.

Adherence to the design principle of loose coupling is a necessary but insufficient condition for a successful distributed architecture. A very pragmatic concern is conformance to industry standards. Without conformance to standards, a combination of monolithic home-grown solutions and vendor lock-in to proprietary solutions is inevitable. The collection of standards surrounding Web services is being overwhelmingly embraced by industry, supported through groups including the World Wide Web Consortium (W3C), Organization for the Advancement of Structured Information Standards (OASIS), and the Web Services Interoperability Organization (WS-I). In the context of Web service orchestration, the most important standard is BPEL (Business Process Execution Language), which is undergoing standardization in OASIS. BPEL provides a language for Web service orchestration in terms of processes and activities. The activities include primitive activities such as receiving and replying to messages, invoking services, and simple data manipulation as well as structured activities such as sequence and flow that can be hierarchically arranged to create sophisticated business logic.

BPEL depends on WSDL (Web Service Description Language), standardized by W3C. All services that are accessed through BPEL are done so through the abstract interface described in WSDL. Adherence to this abstraction is part of what facilitates easy integration of heterogeneous components in BPEL, because it matters not what language or platform a particular component is implemented with, so long as it exposes its functionality as a service described in a WSDL.

BPEL leverages other Web service standards as well, such as extensible markup language (XML) Schema for a data model and XPath as a query language. In addition to these standards, a number of second-generation Web service standards will become increasingly relevant to BPEL. As these newer standards mature, more explicit ties to BPEL can be expected; covering areas such as reliable messaging and Web service based distributed transactions. The Web service family of specifications thus includes both a core set that is already mature as well as a set of up-and-coming standards for future needs.

SUMMARY

The embodiments of the present invention provide process prediction functionality in the context of an enterprise software system, Web services based system and similar environments. The system may be designed to process long running processes and transactions. Processes that are not running may be stored and reactivated when necessary. A program manager may handle the activation and deactivation of the processes. Processes may be retrieved from a database and supplied to the execution engine. In one embodiment, the processes may be business process execution language (BPEL) processes.

The prediction functionality may be provided by a prediction module in communication with an execution engine in the runtime engine of the system. The process prediction functionality provides multiple levels of granularity in making predictions from predicting individual bits and bytes to predicting process and transactional outcomes, range from a technical level to a business level and range from a micro-scale to a macro-scale. The process prediction may take the form of a virtual message, event, process outcome or a process definition. The prediction module receives process state, description and history information from the execution engine and applies learning algorithms to update a model for generating predictions based on the process state information. These predictions are returned to the execution engine and may be utilized under specified conditions. The predictions may be immediate or long range. Long range predictions may be generated through interaction with the execution module operating in a virtual state. The predictions may be generated for viewing by a user and may be accompanied by a confidence level. The prediction module may access a domain-specific knowledge base that provides semantic information.

The process prediction module may include a learning module or may be in communication with a separate learning module. The learning module may generate the model applied by the prediction module based on inductive analysis, instance based reasoning or similar learning algorithms. Learning algorithms and methods may include the use of case based reasoning, decisions trees, and similar learning tools.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this discussion are not necessarily to the same embodiment, and such references mean at least one.

DETAILED DESCRIPTION

The invention is described below, with reference to detailed illustrative embodiments. It will be apparent that the invention may be embodied in a wide variety of forms, some of which may be quite different from those of the disclosed embodiments. Consequently, the specific structural and functional details disclosed herein are merely representative and do not limit the scope of the invention.

A service-oriented architecture is a design model deeply rooted in the concept of encapsulating application logic within services that interact via a common communication framework. This technical architecture is concretely embodied in strategic application of Web service technologies. The present invention provides an integration platform for implementing this architecture.

Web services facilitate integration, but individual services need to be orchestrated together to achieve higher-level business goals. For example, consider a scenario from the travel industry, where a company offers travel services on the Web. The services might include operations such as getting available hotels, getting hotel descriptions, getting rates, and making and canceling reservations.

Figure 1:
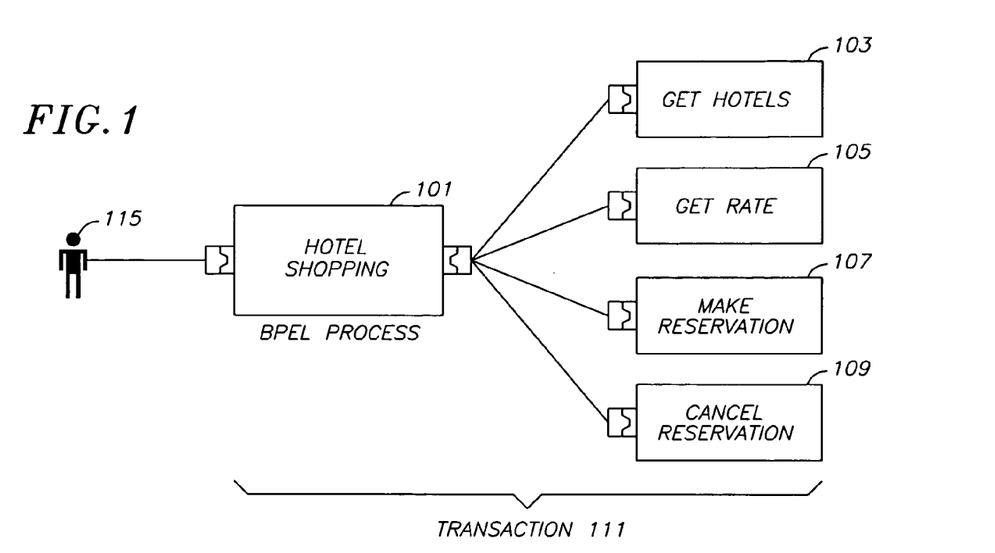
FIG. 1 is a diagram of an example travel service.

FIG. 1 is a diagram of such an example travel service. Multiple processes in any Web service should be orchestrated together to achieve higher-level business goals. The travel service may be designed to be a reusable service that represents some common scenario, such as shopping for a hotel. Multiple processes may be utilized in making a reservation.

In the example of FIG. 1, the online reservation system may include a hotel shopping service 101 that is responsible for interfacing with a user. The hotel shopping service 101 may be responsible for the graphical user interface provided to the user and for the coordination of other related processes or services. Other services or processes that may be a part of the reservation system include a 'get hotels' service 103, a 'get rates' service 105, a 'make reservation' service 107 and a 'cancel reservation' service 109.

Some services may be invoked serially. For example, to find a hotel at a destination, a list of hotels near an airport associated with the destination may be obtained using the 'get hotels' service 103, then a request for rates may be performed through the 'get rates' service for each of the hotels returned. In other cases, operations may execute in parallel for either efficiency or application-specific reasons. There may also be conditional logic incorporated into processes and services or specified by a user, such as making a reservation only if the rate is within a designated budget.

A service as used herein, refers to a component that performs a specified function, which may be implemented as a set of processes. A process as used herein refers to a discrete operational component designed to complete a task or set of tasks. In one embodiment, tasks may include actions such as receiving and replying to messages, invoking Web services, sequences, parallel flows, and conditional actions. In one embodiment, tasks may be modeled as activities in the business process execution language (BPEL). Thus, orchestration in BPEL may be primarily a matter of picking which activities are performed by a process and arranging those activities to reflect desired business logic. The resulting business process, when deployed in a BPEL engine may be published as a Web service. These activity structures combined with other BPEL concepts such as message correlation, serve to introduce stateful interactions into the stateless model of Web services.

In one embodiment, processes, such as BPEL processes, may be executed or interpreted by a runtime engine. The runtime engine may support a number of requirements, including native support for Web service standards as well as asynchronous messaging, process persistence, and transactional models consistent with long-term processes. In one embodiment, the integration platform may be a native BPEL integration platform that supports these requirements. For sake of convenience, when a process is referred to as executed, this may refer to the process being acted upon by an interpreter or executed as compiled code.

Figure 2:
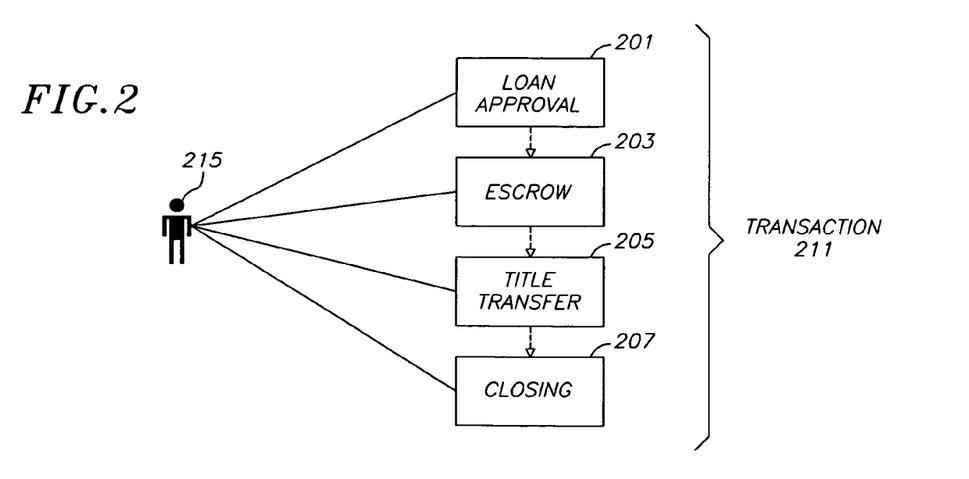
FIG. 2 is a diagram of an example home sale transaction.

As used herein, a transaction may refer to a set of related actions that may encompass the use of multiple services or processes. For example, a transaction 111 may be a reservation of a ticket by a user 115 through the hotel shopping service 101 and the related services. In another example, illustrated in FIG. 2, a transaction may be a set of related actions that may encompass more loosely associated services and processes. A user 215 may be engaged in the purchase of a house, which may be characterized as a transaction 211. The transaction 211 encompasses individual services and processes including a loan approval process 201, an escrow service 203, a title transfer service 205 and a closing process 207.

Figure 3:
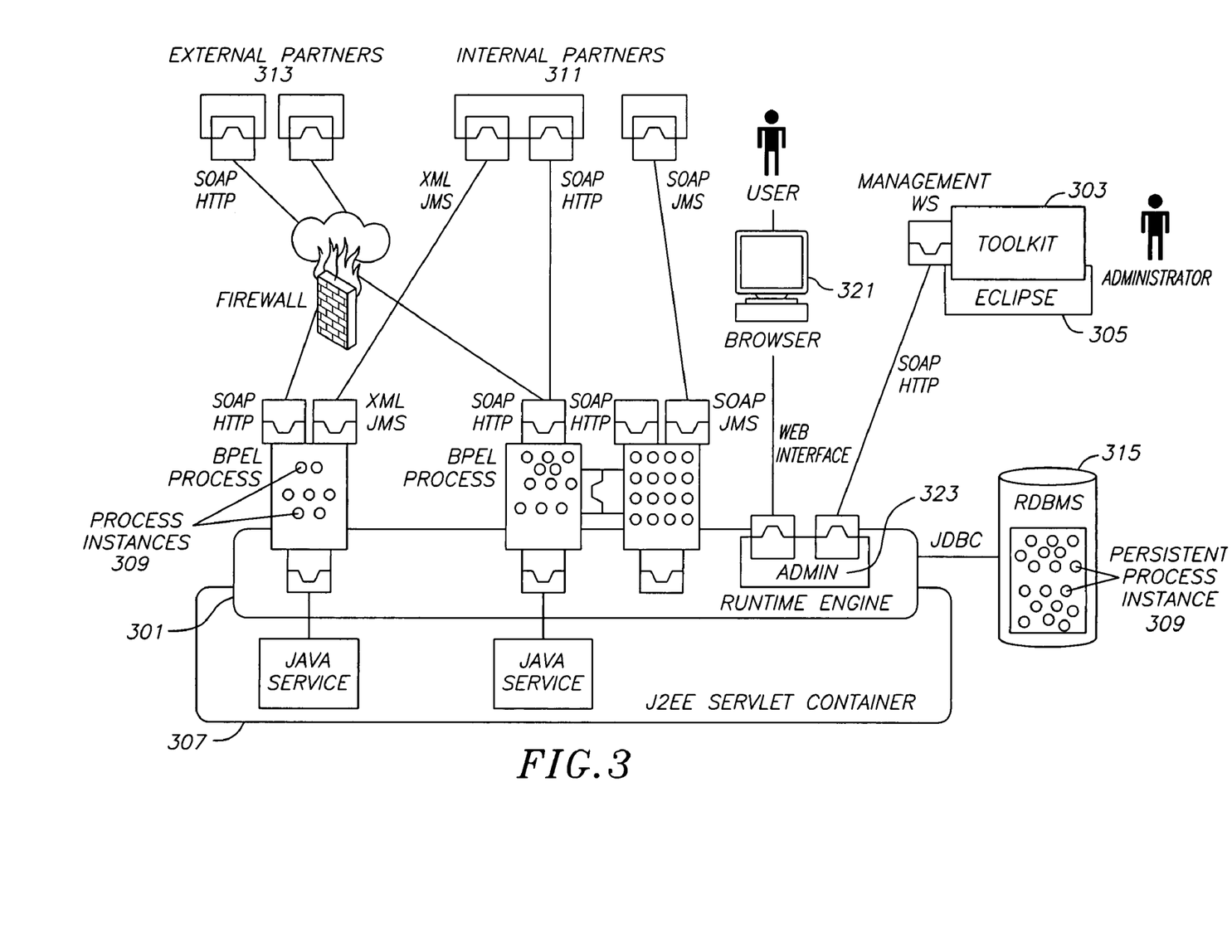
FIG. 3 is a diagram of one embodiment of an integration platform.

FIG. 3 is a diagram of one embodiment of the integration platform. In one embodiment, the integration platform of the present invention includes a web service orchestration runtime engine 301 and development toolkit 303 that facilitates loose coupling between modules and conforms to industry standards. The toolkit 303 provides easy development, debugging, and management of processes. The runtime engine 301 executes processes including long-running processes in service-oriented architectures with transactional integrity.

In one embodiment, a feature of the system is the loose coupling between components. Although some dependencies between components may be present, these dependencies may be minimized. Dependencies are minimized both by having components communicate through published interfaces and through the use of lightweight message passing models.

The benefits of loose coupling are at least three-fold. First, loosely coupled components are more flexible and amenable to independent changes than those that are tightly coupled. In the context of business processes, this translates directly into enterprise agility in changing market conditions. Second, loosely coupled architectures are more robust to unreliable elements of the system, be they networking infrastructure or application components themselves. This benefit is gained by not requiring all application components to necessarily be available at the same time, including applications that may span internal and external partners in both intranet and internet environments. Loose coupling results in greater scalability than more tightly coupled systems, partly by eschewing heavyweight distributed computing features such as distributed garbage collection.

In one embodiment, the present invention is an integration platform for Web service orchestration that includes a runtime engine 301 as well as a toolkit 303. In one embodiment the toolkit 303 may be a plug-in for Eclipse 305 by the Eclipse Foundation of Ottawa, Ontario. The engine 301 may be designed to execute BPEL processes and run inside a J2EE servlet container 307 or similar environment.

The runtime engine 301 may manage multiple process instances 309. Process instances 309 participate in extended conversations with partners. The term partners here is used to designate business process participants in a broad sense that includes systems, software, and people, including internal partners 311 within an enterprise and external partners 313 outside the enterprise, through Web service protocols and persist in a relational database management system (RDBMS) 315. In addition, to facilitating developing and debugging processes, the toolkit 303 enables remote management of the runtime engine 301.

In one embodiment, processes are executed by a runtime engine 301 that supports a number of requirements. The runtime engine 301 provides abstractions and infrastructure particularly suited to service-oriented architectures. Specifically, it provides native support for Web service standards, as well as asynchronous messaging, process persistence and transactional models consistent with long-term processes. In one embodiment, the invention implements a web services description language (WSDL)-centric view of Web services and provides for a flexible, standards-based approach to application integration by supporting Web services standards such as WSDL, simple object access protocol (SOAP), XML, hyper text transfer protocol (HTTP), Java messaging service (JMS) by Sun Microsystems® of Santa Clara, Calif., Web services (WS)-addressing, and Web services interoperability organization (WS-I) basic profiles.

In one embodiment, message exchanges may be described in a process in terms of portTypes and operations defined in the WSDL. Therefore, because the runtime engine 301 may be WSDL-centric and support Web service standards, more flexibility is available on the messaging layer.

In one embodiment, to properly and successfully orchestrate Web services, stateless modules may be composed into functional and stateful interactions. For simple business processes, stateless services are adequate. However, for more complex processes to receive multiple messages, they must be able to remember the salient points from the beginning of the conversation instead of having to start from scratch when they receive another message. The runtime engine 301 correlates synchronous and asynchronous message exchanges in extended stateful conversations and enables services to remember enough context to continue conversations as extended threads rather than as separate interactions.

In one embodiment, the integration platform and runtime engine includes support for a set of features that include asynchronous messaging, process persistence, scalability through dehydration, application correlation, native BPEL implementation, full-lifecycle BPEL solutions, Web Service standards, and transactional integrity. In other embodiments, different subsets of these features may be supported.

In one embodiment, the runtime engine 301 supports asynchronous messaging. Having a request/response on a single HTTP connection is appropriate for operations at the millisecond timescale, but isn't appropriate for a connection with a long duration, such as a duration of days, weeks or months. For long running processes, asynchronous messaging may be used, where a response message is sent in a separate channel from the request message. The runtime engine 301 may support asynchronous messaging through JMS based enterprise messaging systems for reliable asynchronous messaging and SOAP over HTTP with callbacks via WS-Addressing for lightweight asynchronous solution and similar communication systems.

In one embodiment, the runtime engine 301 supports process persistence. Process instances may execute for weeks and months and the process state persists across power cycles. The runtime engine 301 accommodates this by providing a persisting process state for each process instance in a standard RDBMS, accessed through Java database connectivity (JDBC), by Sun Microsystems®.

In one embodiment, the runtime engine 301 supports scalability through dehydration. Because there may be many long running processes, at any given time there may be many process instances which are waiting for an event to occur, such as a message to be received or a timer to expire. The longer the processes run, the more processes there will be in such a state. The runtime engine 301 manages when process instances are brought into memory, a process referred to as hydration, and when they are purged from memory and reside solely in the RDBMS, a process called dehydration. The runtime engine 301 performs these tasks automatically, though hydration policy can also be configured on a per-process basis.

In one embodiment, the runtime engine 301 may support application-level correlation. Web service orchestration involves correlating message exchanges based on application data to compose extended, stateful conversations. Correlations may be utilized to indicate which messages should be routed to particular process instance. For example, in languages such as BPEL, where processes are implicitly instantiated, multiple process instances may reside within a single endpoint location, so message correlation may be used to provide process integrity. Application-level correlations support the determination of the proper process instance based on application data in the message itself, as opposed to metadata associated with the message. In one embodiment, the runtime engine 301 may also support native BPEL implementation by being designed from the ground up to natively implement the BPEL standard, which allows the full leverage of the BPEL. The runtime engine 301 may support a full-lifecycle BPEL solution, that is, the complete integration platform may provide tools to develop, debug, test, deploy, and manage processes including BPEL processes. In one embodiment, the integration platform provides such a development/debugging/management toolkit in the Eclipse environment.

In one embodiment the integration platform supports Web service standards. Support for Web service standards provides interoperability and avoids proprietary vendor lock-in. The integration platform may include full feature support for BPEL, WSDL, SOAP, XML, HTTP, JMS, WS-Addressing and may conform to WS-I basic profiles. Second generation Web service standards and similar standards and protocols may also be supported.

In one embodiment, the system supports transactional integrity. The system distinguishes between different transactional models for long-running transactions and short-term transactions. The ACID model (atomic, consistent, isolated, durable) may be employed for short-term transactions using conventional transactional primitives such as commit and roll-back. However, this model is inappropriate for long-running transactions, because it requires locking of resources for unreasonable amounts of time. In these situations, an action is performed and if the action needs to be reversed, a compensation action is designated for this task, obviating the need to lock resources for the duration of the transaction. In one embodiment, the system supports the compensation types outlined in the BPEL specification and similar models. These models may be supported within a single process, so long-term transactions can consist of short-term sub-transactions.

In one embodiment, the system supports process-aware modeling. The modeling tools provide modeling primitives for process abstractions, including BPEL process abstractions. The modeling may include three views of a process: a high-level view centered on a universal markup language (UML) activity diagram, a mid-level document-object model view in the form of a tree structure, and a low level text view with syntax highlighting and browsing capabilities. This modeling is discussed at greater length below in conjunction with FIGS. 8 and 9.

In one embodiment, the toolkit 303 supports remote debugging. The toolkit 303 supports debugging distributed applications and provides full-featured remote debugging capabilities. The toolkit 303 provides for remotely debugging processes executing in the runtime engine from inside the debugger. The remote debugging may be fully integrated with the high-level process modeling capabilities.

In one embodiment, the integration platform may be monitored or administered through interaction with the runtime engine 301. A user may access an administration interface provided by an administration component 323. The interface may be accessed through a web browser 321, specialized application or similar interface.

Figure 4:
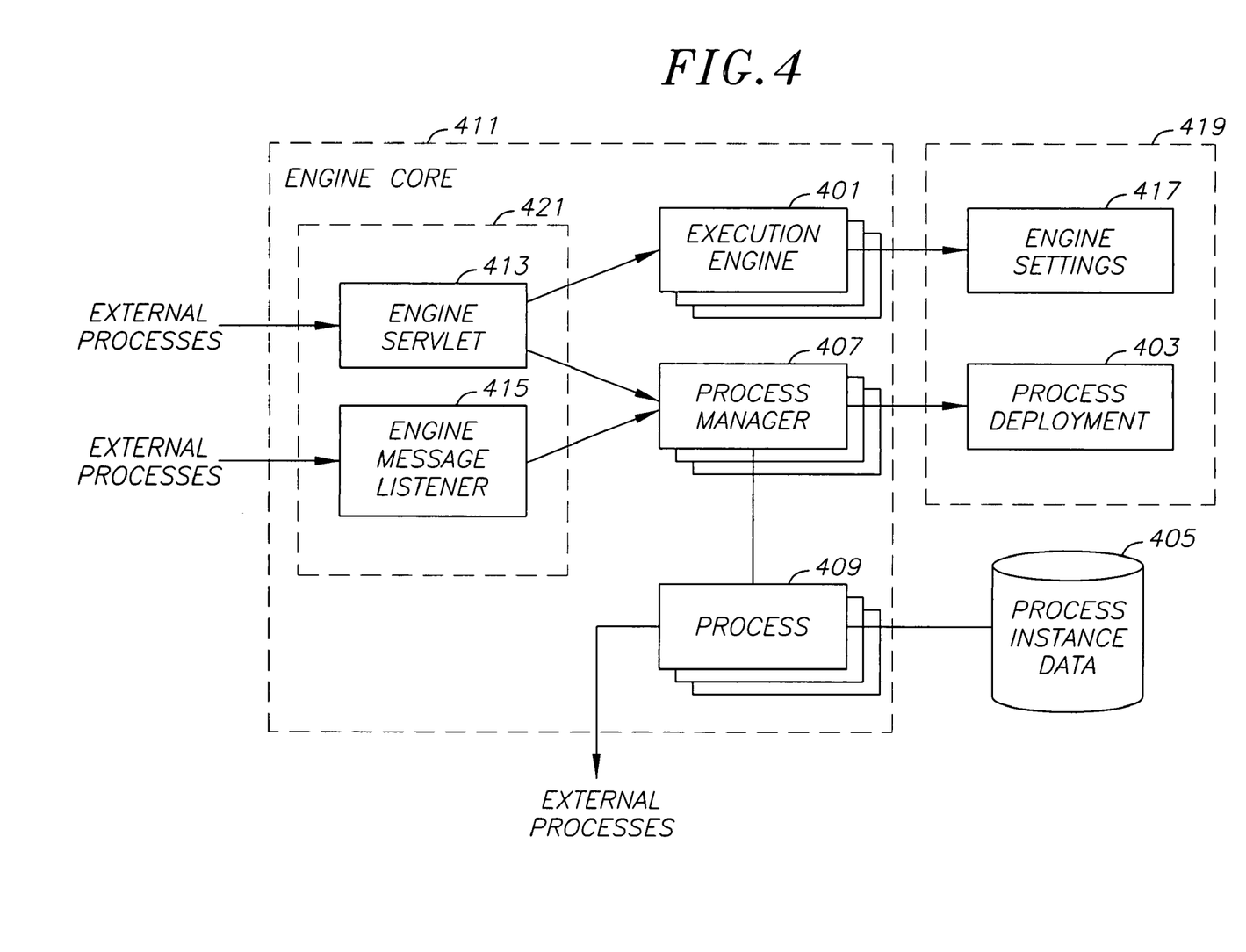
FIG. 4 is a diagram of one embodiment of a runtime engine and related components.

FIG. 4 is a diagram of one embodiment of a runtime engine and related components. The runtime engine includes an engine core 411 that manages the execution of long running processes and communication with these processes. The engine core 411 includes an execution engine 401, a process manager 407, processes 409, and a communication interface 421.

The execution engine 401 executes the individual processes that are managed by the runtime engine. The execution engine 401 manages the state of each process 409 and the runtime engine environment as processes 409 are executed. In one embodiment, the engine core 411 may have multiple execution engines 401 to support parallel processing of processes 409. The engine settings 417 may be stored in a local or remote file system 419. The engine settings 417 may include whether or not process history or similar history recording is enabled, whether process instances are to be transient or persistent, configuration details for accessing a persistent data store, such as a relational database management system, endpoint information such as HTTP addresses, JMS addresses, simple mail transfer protocol (SMTP) addresses, and Java Naming and Directory Interface (JNDI by Sun Microsystems®) settings, settings associated with any external reporting systems, security information for various users. In another embodiment, the engine settings 419 may be stored in a database or similar data storage structure.

In one embodiment, a process manager 407 manages the hydration and dehydration of processes 409. Process managers 407 may manage a single process or a group of processes. The process managers 407 may be responsible for managing related processes, such as processes related to a service or transaction. The process managers 407 may hydrate a process by combining the stored instance data with process description data that may be part of a process deployment 403. A process deployment 403 may be a component that includes a set of process descriptions that may be stored in a local or remote file system 419. Deployments may include process descriptions in some process description language such as BPEL, service descriptions such as those in WSDL, type definitions such as those in XML Schema, and deployment descriptors such as those in XML. In another embodiment, the process deployment 403 may be a part of a database or similar data storage structure.

The engine core 411 may support the processing of any number of processes 409. Long running processes that do not have data ready to be processed may be stored until ready to be executed again. The processes 409 may be stored in a local or remote process instance database 405. The process instance data that is stored in the database 405 may include state information, parameters, attributes and similar data related to the process instance being stored. The process description does not need to be stored as it is generic to the process type and is part of the process deployment. The version of the process descriptor may be stored with the instance data to ensure the correct version of the process instance is hydrated.

In one embodiment, the engine core 411 includes a communication interface 421 to allow communication between the execution engine 401, the process manager 407 and processes 409 and external processes. The external processes may be internal or external to the integration platform. External links may be with partners over partner links. Partners may be related or affiliated systems that have been approved to access at least some of the features of the integration platform. The data received by the execution engine 401 and process manager 407 may be intended for a particular process instance and may trigger the execution or hydration of that process instance. Data received from external processes may also be administrative or related to interaction with the toolkit, debuggers or similar components of the system. The communication interface 421 may include different components that communicate using different services, protocols and communication paths. In one embodiment, the communication interface may include an engine servlet 413 such as an HTTP servlet or similar communications component. The communications interface 421 may also include an engine message listener 415, such as a Java Messaging Service (JMS) listener, by Sun Microsystems®, or similar components. The communication interface 421 may provide bidirectional communication between the engine core 411 and external processes. In one embodiment, some processes in the engine core 411 may communicate through the communication interface 421 or may have the capability of directly communicating with external processes.

Figure 5:
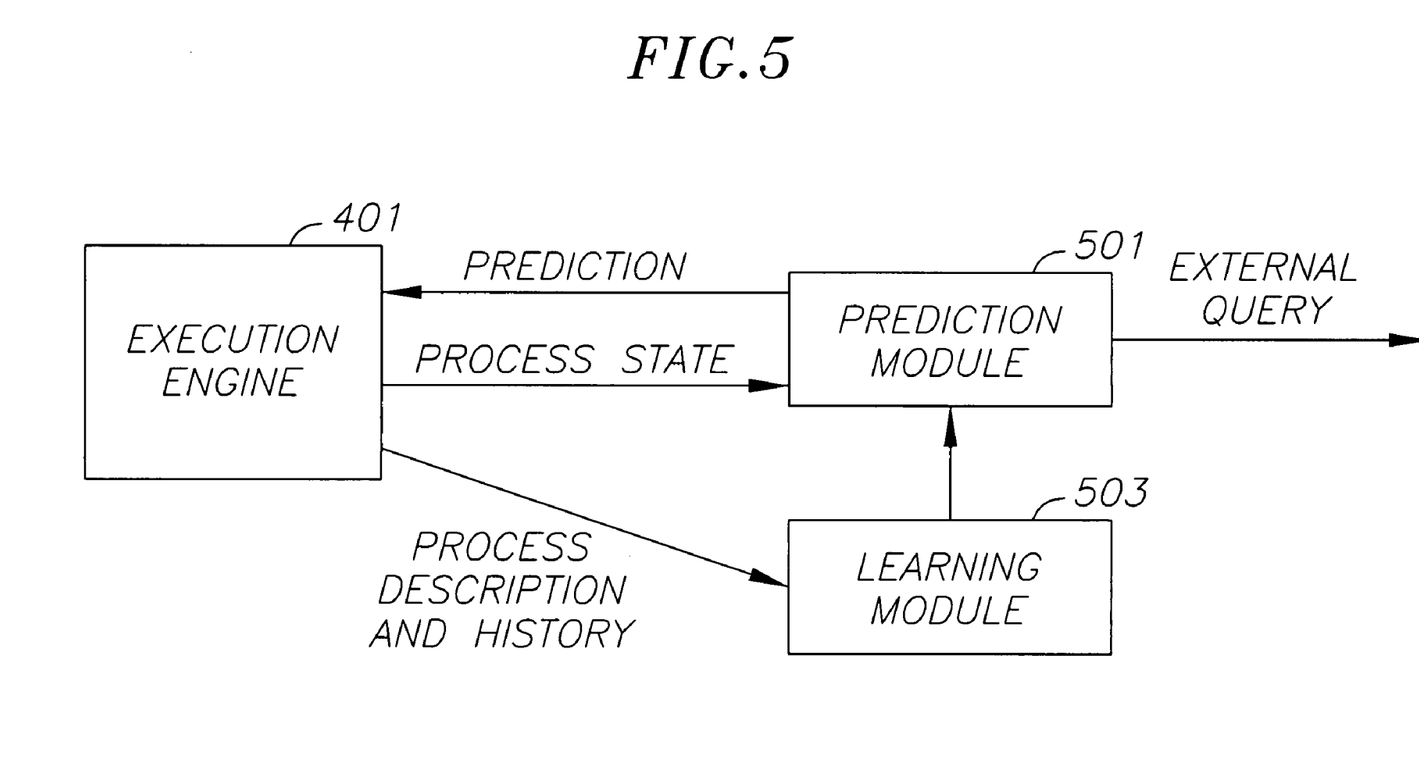
FIG. 5 is a diagram of one embodiment of the components of a runtime engine.

FIG. 5 is a diagram of one embodiment of the components of a runtime engine. The runtime engine may include a prediction module 501 in communication with the execution engine 401. The prediction module 501 generates predictions for use by the execution engine 401. Predictions may be of message events (both message types and message contents), or outcome for a process or group of processes that may be executed by the execution engine 401. The predictions may be supplied to the execution engine in the form of virtual messages, virtual attributes, virtual parameters or similar input. The predictions may be made at any level of granularity from predictions of individual bits of data to general outputs of services, processes or transactions, from a micro level to macro level and from an individual process level to a business transaction outcome. Predictions may be used by an execution engine 401 when an expected input is not available and may be utilized under designated conditions. For example, a process may wait for a designated period of time for input data to be received. If the data is not received within the designated period of time then the execution engine 401 may utilize a predicted value, message, outcome or similar prediction provided by the prediction module in place of the expected data. The prediction information may be provided with a reliability rating or confidence level. The confidence level or reliability rating may be used as conditional information for determining the use of the prediction data.

Predictions may be determined by the application of a model, a domain specific knowledge base or similar information to the process state information supplied by the execution engine. Basic predictions may be related to message events. For example, the types of message event predictions may include predictions of the type of message that will be received and predictions of the content of the message to be received. In one embodiment, the prediction module uses as input a former prediction or a set of former predictions. At any point in the execution of a process the next message event may be predicted by posing a query of what happened in similar processes historically at a similar point in the execution process. For example, a prediction module working with a travel planning process may notice that after travelers book their flight and hotel, they arrange for ground transportation, thus a corresponding message type may be predicted. Similarly, the contents of the message may be predicted in terms of process state information or preceding messages. In the travel planning example, a ground transportation query may be parameterized by the preceding flight and hotel parameters, such as ground transportation from a particular airport at a particular time to the specified hotel. Some components of the predicted messages may be further constrained by correlation values of the process instance. Message prediction may use a combination of inductive learning based on process history information and analytical predictions based on constraints imposed by the process descriptions as interpreted through the semantics of the process description language. This interplay between the process semantics and the process history reflects a synergistic relationship between the execution engine and the prediction module which enables message prediction with an accuracy that cannot be achieved through either information source in isolation.

In one embodiment, the prediction module 501 may provide predictions in response to an external query. The external query may be from a toolkit user, debugging program, an administrator or other user. The prediction information may be used to monitor expected outcomes, upcoming events and similar activities. This information may also be supplied to user along with the confidence level or reliability rating. For example, a loan processing agent may want to review prediction information to see what the likely outcome of the loan process will be for a particular application. This information may be provided to the applicant to advise them on their application along with confidence level information. The application information could also be modified without confirming the changes to generate revised predictions to determine whether the changes improve the application outcome or confidence level.

In one embodiment, the prediction module 501 works in combination with a learning module 503 and the execution engine 401 to generate predictions. The learning module 503 may be a separate component or may be a subcomponent of the prediction module 501. The learning module 503 may generate a model or group of models for application to the process state supplied by the execution engine to the prediction module. In one embodiment, the model may take the form of a decision tree for predicting message events, where the nodes of the decision tree involve preceding message events or values within the process state. Such a decision tree may be logic-based, including use of first order logic, predicate calculus or similar logic. The decision tree may include probabilistic elements, including Bayesian probabilities and similar probability systems information. In a further embodiment, combinations of logic-based and probabilistic elements may be used. The model may be explicit and stored either in memory as internal data structures or stored persistently in external files or in a database. Alternatively, the model may be implicit and generated upon each query, as is the case of instance based learning methods such as case based reasoning.

The learning module 503 may apply machine learning processes or similar analytical processes to process description and history data supplied by the execution engine 401. Process histories may take the form of machine-processable audit trails. In one embodiment, an audit trail is an XML file and each event (e.g. message events, assignment events, fault events, and similar events) is represented as an element, with event details such as message contents or assignment values as sub-elements. In one embodiment, the learning module 503 may apply instance based learning or induction based reasoning algorithms to the process history and process descriptors to generate models, decision trees and similar structures for generating predictions based on the process history and description. Machine learning algorithms applicable to these models include decision tree learning algorithms, artificial neural network algorithms, Bayesian classifiers, instance-based learning algorithms, nearest-neighbor algorithms, case-based reasoning, and genetic algorithms. The outputs from these algorithms may be an explicit model such as one to be used for message prediction, or in the case of instance-based methods, the prediction itself. The inputs to these algorithms may be the combination of historical events and value constraints. Because the constraints may be complex and depend on the operational semantics of the execution language, the predictions may be iterative, where a prediction is made and iteratively refined through constraints imposed by an interpreter of the process execution language. The learning module 503 may maintain history data for each process and update the history as it is supplied to the learning module by the execution engine. In another embodiment, the process history data may be maintained over time by a process manager or similar component. The history data may be stored with the process instance data, process description data or may be stored separately. The history data may be restricted to data generated by a particular instance of a process, or may include data from other instances of the same process or data from related processes.

Figure 6:
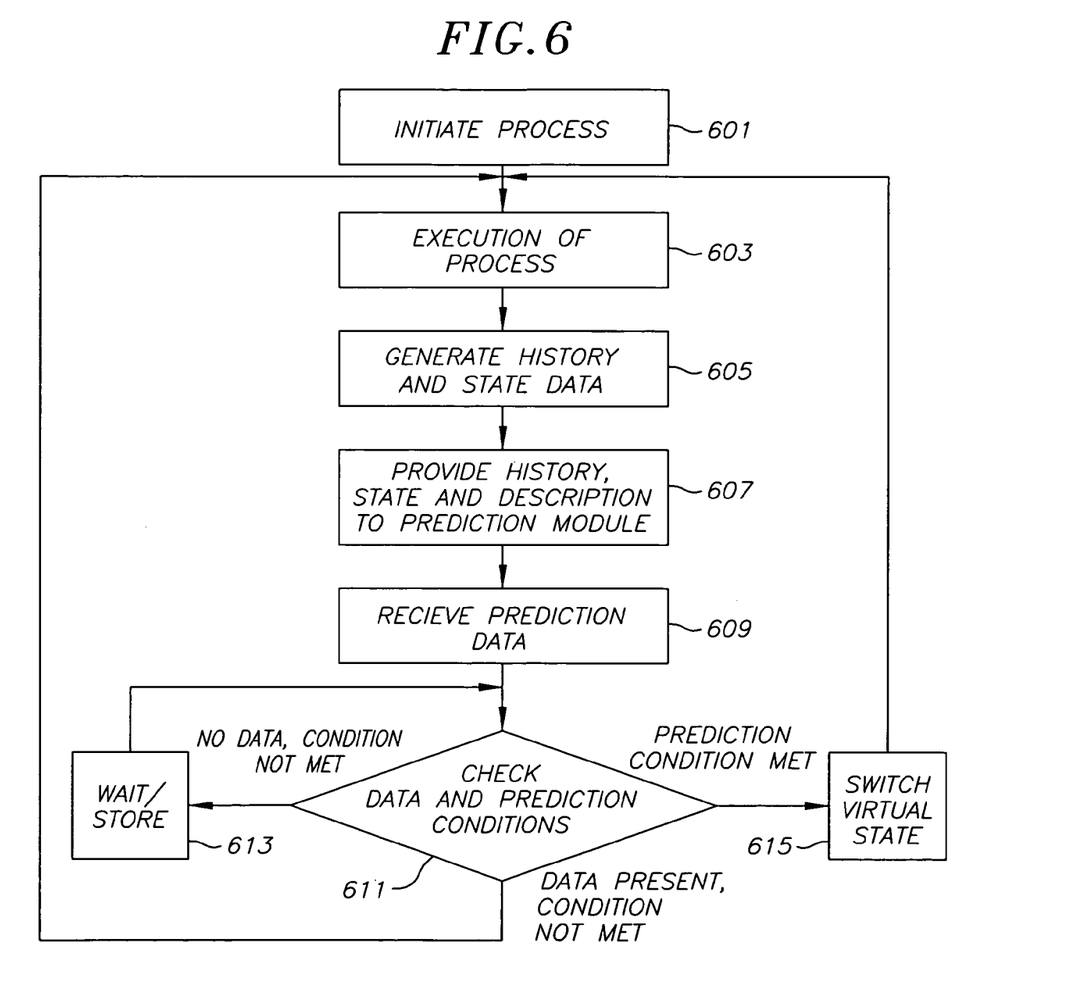
FIG. 6 is a flow chart of one embodiment of a process for prediction data utilization by an execution engine.

FIG. 6 is a flow chart of one embodiment of a process for prediction data utilization by the execution engine. In one embodiment, the execution engine will have a process assigned to it for execution by a process manager or similar component (block 601). The process may be being executed for the first time or may be a hydrated process. The execution engine executes the process (block 603) and generates history data and updates the state of the runtime engine and the process (block 605). The history data, process description data and state data may be sent to the prediction module including a learning module subcomponent (block 607). In another embodiment, the process description and history data are sent to a separate learning module and the process state may be sent to the prediction module.

In one embodiment, the prediction data is subsequently returned to the execution engine from the prediction module (block 609). A check may be made to determine whether prediction data is to be utilized (block 611). If all requisite data is available for the process to continue to execute, then the execution will continue (block 603). If data necessary for the process to continue executing is not available and prediction conditions are not present, then the process may wait on that data or may be dehydrated (block 613). A check may be periodically made to determine if a change in prediction conditions or the availability of data has occurred. An example of a prediction condition includes a minimum confidence level of the prediction as produced and evaluated by the prediction module. An event, such as the reception of data in a message for the process, may trigger the continued execution or the hydration of the process. If needed data is not present but prediction conditions are met then the execution engine may utilize prediction data in place of the expected data. The execution engine may switch to the virtual state based on the prediction data or may treat received virtual messages or data as the expected messages or data.

Figure 7:
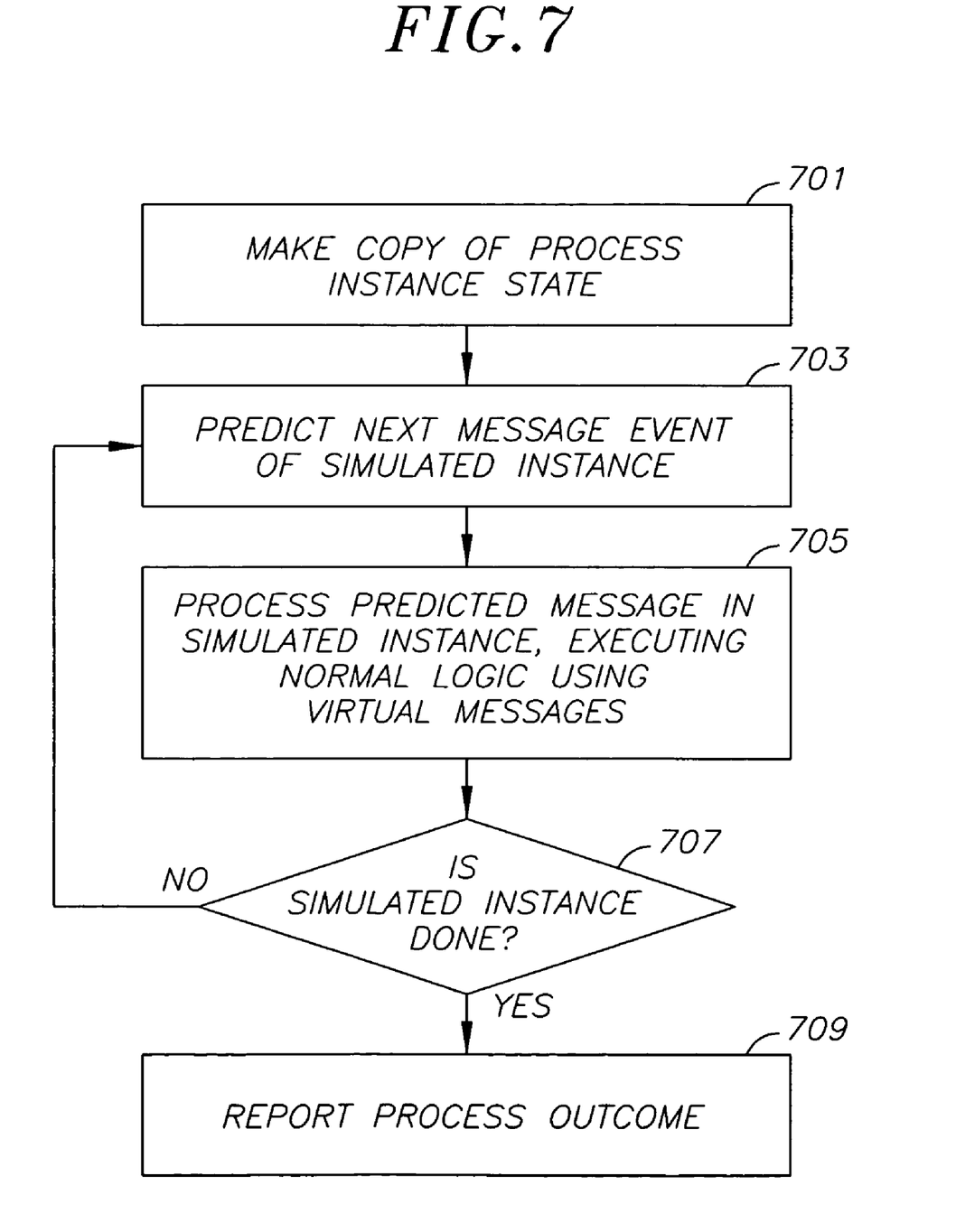
FIG. 7 is a flow chart of one embodiment of a long range prediction process.

FIG. 7 is a flow chart of one embodiment of a long range prediction process. In one embodiment, the process of generating a prediction may utilize the execution engine and may take multiple iterations of interaction between the execution engine, prediction module and learning module. This process may be necessary to generate predictions related to outcomes with a longer range view, multiple intermediary steps and similar characteristics. The execution engine may support a virtual state to allow the processing of intermediate virtual predictions to generate an end predicted outcome. The long range prediction process may start with the execution engine supplying process description and process history data to the learning module and process state information to the prediction module (block 701). The learning module analyzes the process history and description information and updates a model which is provided to the prediction module (block 703).

Message predictions may be combined to produce predictions of larger scope, including the prediction of process outcomes. In one embodiment, process outcome prediction proceeds as illustrated in FIG. 7. The prediction module, in cooperation with the execution engine, makes a copy of the state of the process instance being executed or which is relevant to a requested prediction (block 701). The copy may be referred to as the simulated or virtual instance. The prediction module predicts the next message event for the virtual instance (block 703). The execution engine processes this predicted or virtual message event on the virtual instance, updating virtual state information based on the normal process logic (block 705). Although this simulation may use the normal runtime engine execution logic, by making a separate copy of the process state, it avoids impacting the actual process execution. Also, communication is quashed for the virtual instance so as to avoid sending messages to real partners from the simulation. After the virtual process reaches a state of quiescence, the next message event for the simulated process state may be predicted (block 703). The prediction and execution process continues until the virtual instance reaches completion (block 707). If the virtual instance has completed or the queried prediction is obtained, then the outcome may be reported as the predicted process outcome (block 709). Along with the process outcome, a complete future history in the form of a predicted audit trail may be provided as a detailed explanation of the process outcome prediction. This process may include the simulation of multiple process instances. These processes are managed as virtual processes to avoid affecting the actual state of the system.

Figure 8:
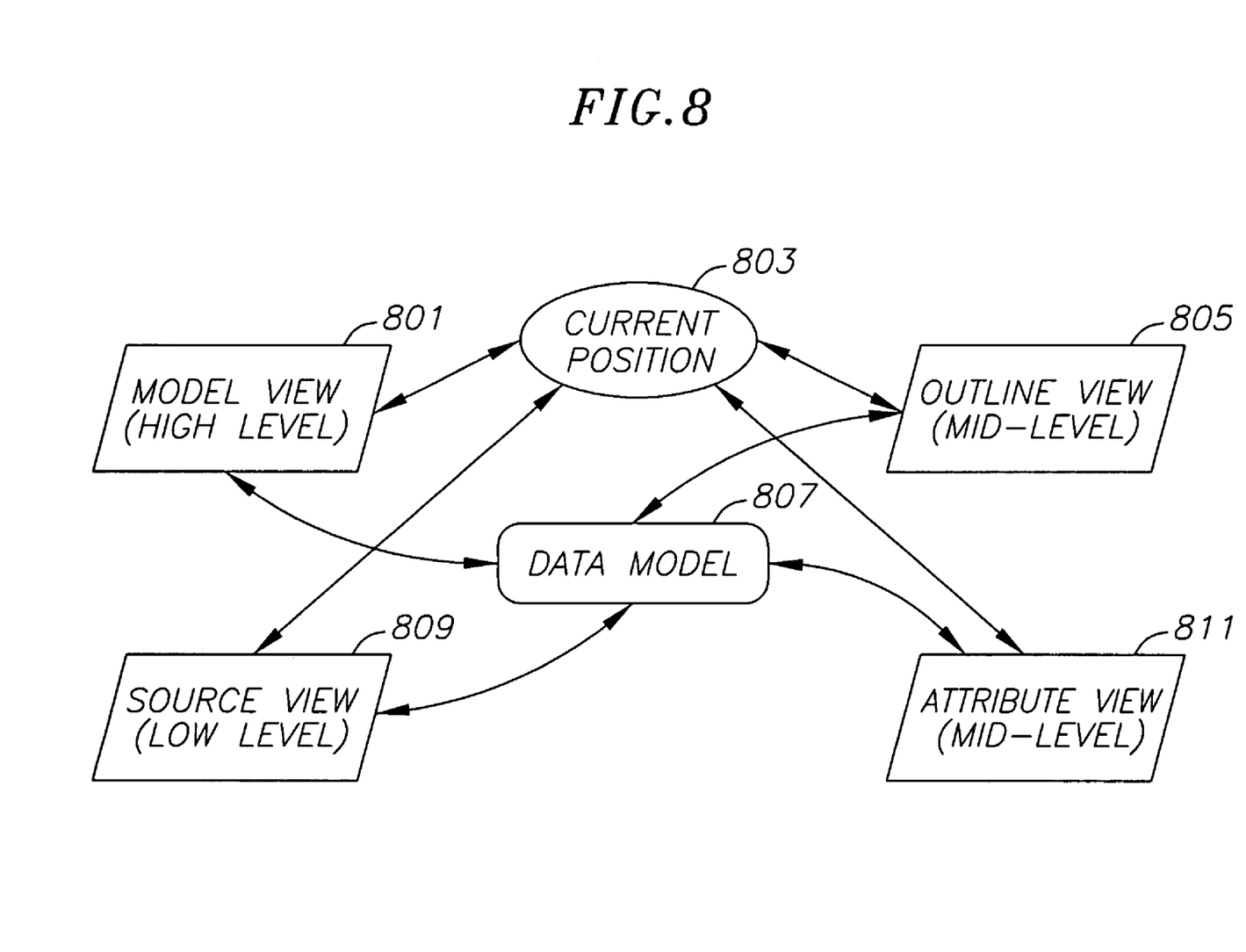
FIG. 8 is a diagram of an example of a conceptual representation of a multiple view model of system data.

FIG. 8 is a diagram of one embodiment of a conceptual representation of a multiple view model of system data. In one embodiment, the software tool of the present invention includes the capability of multiple view editing. Each view shows the same process, but at differing levels of granularity. The views enable edits to be performed on a common data model 807 that is shared between the views. The data model 807, in turn, propagates changes to update each view. There is also a current position 803 which is shared between the views. The shared current position 803 enables a user to navigate in one view and for the other views to track with the navigation.

The various views for editing processes, such as BPEL processes, are based on the single data model of the process itself. This approach contrasts with modeling tools in which the user needs to specify how to lay-out the process visually, because the only artifact that is needed is the process itself. This feature may arrange the elements under various constraints such as the connections between the elements, a constraint that elements are not overlapping, and that the total space used is minimized. The visual representation of a particular process is thus the solution to a well-defined constraint satisfaction problem. In one embodiment, the visual representations of the data model 807 include a source level view 809, an attribute level view 811, an outline level view 805 and a model level view.

Figure 9:
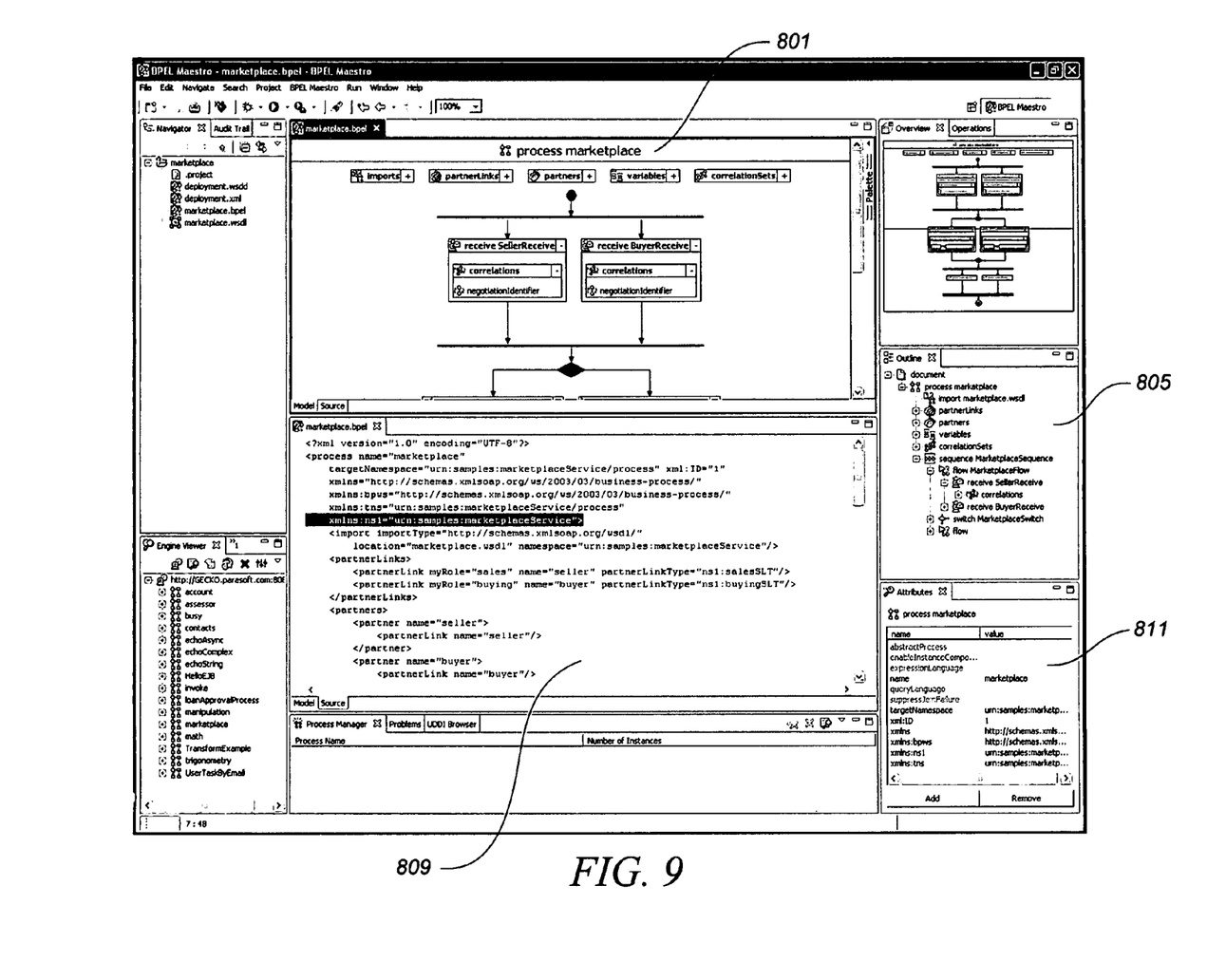
FIG. 9 is an illustration of one embodiment of a graphical user interface presenting a multiple level view of the data model.

FIG. 9 is an illustration of one embodiment of a graphical user interface presenting the multiple level view of the data model. Each view may be presented through the graphical user interface as a separate window or similar interactive mechanism. The source level view 809 displays the source code for a process or a component of a process. The attribute level view 811 presents a listing attributes and the values of each attribute. The listing may be in a spreadsheet, table, listing or similar format. The outline level view 805 present the processes, attributes, links and similar characteristics of a process in an outline form. The model level view 801 presents a graphical view of processes and similar components, where each is represented by a graphical symbol or icon and relationships may be expressed by connecting lines or similar systems.

In one embodiment, the multiple level view may be integrated into the toolkit or similar component of the system. The multiple level view may allow modification of the processes and data in any view. The changes are then propagated to the other views such that all views display the same data. The multiple level view interface may be used as part of a debugging or development tool. The execution of a process may be stepped through with interaction with the runtime engine for testing, debugging, analysis or presentation purposes. The changes in the system are easily discerned through the changes in the graphical model, where changes at each step may be highlighted. The same changes may also be highlighted in the other views allowing the user to track the execution and function of the system in different view levels simultaneously.

While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A process management system comprising:
 an execution engine to execute a process, the execution engine being configured to provide a process history including an audit trail, a process state and a process description;
 a prediction module in communication with the execution engine, the prediction module being configured to provide a process prediction to the execution engine based on the process history, the process state and the process description; and
 a learning module in communication with the prediction module to process one or more of the process history and the process description and generate a learning model for the prediction module, wherein the learning model includes a decision tree for predicting message events or a process state, where nodes of the decision tree involve preceding message events or values within the process state.

2. The process management system of claim 1, wherein the process prediction includes one or more of a message event, a process outcome and a process definition.

3. The process management system of claim 1, wherein the decision tree is logic-based including use of one or more of first order logic and predicate calculus, and includes probabilistic elements including Bayesian probabilities.

4. The process management system of claim 1, further comprising:
 a domain-specific knowledge base accessible to the prediction module.

5. The process management system of claim 1, further comprising:
 a process manager in communication with the execution engine to retrieve a process description.

6. The process management system of claim 1, further comprising:
 a process instance database for storing processes.

7. The process management system of claim 1, further comprising:
 a graphical user interface to display a process via multiple views.

8. The process management system of claim 7, wherein each view shows a representation of a same data model.

9. The process management system of claim 7, wherein the multiple views are a model view, an outline view, a source view and/or an attribute view.

10. A method for managing processes comprising:
 executing a process by an execution engine;
 generating a process history including an audit trail, and a process state;
 processing one or more of the process history, process state and the process description, and generate a learning model for the prediction module, wherein the learning model includes a decision tree for predicting message events or a process state, where nodes of the decision tree involve preceding message events or values within the process state; and
 processing the process history, the process state and the process description by the prediction module to provide the execution engine with a process prediction.

11. The method for managing processes of claim 10, wherein the process prediction includes a reliability rating or confidence level to be used as conditional information for determining utilization of the process prediction.

12. The method of managing processes of claim 10, wherein the process prediction includes one or more of a message event, a process outcome and a process definition.

13. The method of managing processes of claim 10, further comprising:
 applying one or more of analytic and inductive learning to generate the process prediction.

14. The method of managing processes of claim 10, further comprising:
 applying a domain-specific knowledge base to generate the process prediction.

15. The method of managing processes of claim 10, further comprising:
 applying a process prediction if a time period has elapsed.

16. The method of managing processes of claim 10, further comprising:
 tracking a virtual state.

17. The method of managing processes of claim 10, further comprising:
 generating virtual messages.

18. The method of managing processes of claim 10, wherein a granularity of the process prediction ranges from a technical level to a business level.

19. The method of managing processes of claim 10, wherein the process is a business process execution language (BPEL) process.

20. The method of managing processes of claim 10, wherein the process prediction ranges from a micro-scale to a macro-scale.

21. The method of managing processes of claim 10, wherein the execution engine maintains a virtual state.

22. The method of claim 10, further comprising:
 retrieving the process from a stored state.

23. The method of claim 10, wherein the process is part of a long term transaction.

24. The method of claim 10, further comprising:
 displaying multiple views of a data model representing the process through a graphical user interface.

25. The method of claim 24, wherein the multiple views are a model view, outline view, a source view and an attribute view.

26. The method of claim 24, further comprising:
 updating each of the multiple views automatically upon receiving an input.

27. A method comprising:
 displaying a source of a process including an audit trail through a graphical user interface;
 displaying a model view of the process through the graphical user interface simultaneous with the source;
 displaying an attribute view of the process through the graphical user interface simultaneous with the model view; and
 updating a data model based on input received in any view, wherein the data model includes a decision tree for predicting message events or a process state.

28. The method of claim 27, further comprising:
 displaying an outline view of the process through the graphical user interface simultaneous with the attribute view.

29. The method of claim 27, further comprising:
 updating each view automatically based on the input.

30. The process management system of claim 1, wherein the process prediction includes a reliability rating or confidence level to be used as conditional information for determining utilization of the process prediction.

31. The process management system of claim 1, wherein the process prediction is related to message events and includes predictions of type or predictions of content of message that will be received.

32. The process management system of claim 1, wherein the prediction module is configured to predict a next message event or a next message content by considering what happened in the process histories of similar processes at a similar point in the execution of a process.

33. The process management system of claim 1, wherein the audit trail is a XML file and each event is represented as an element in the XML file.

* * * * *